INVENTOR
Fred G. Parsons

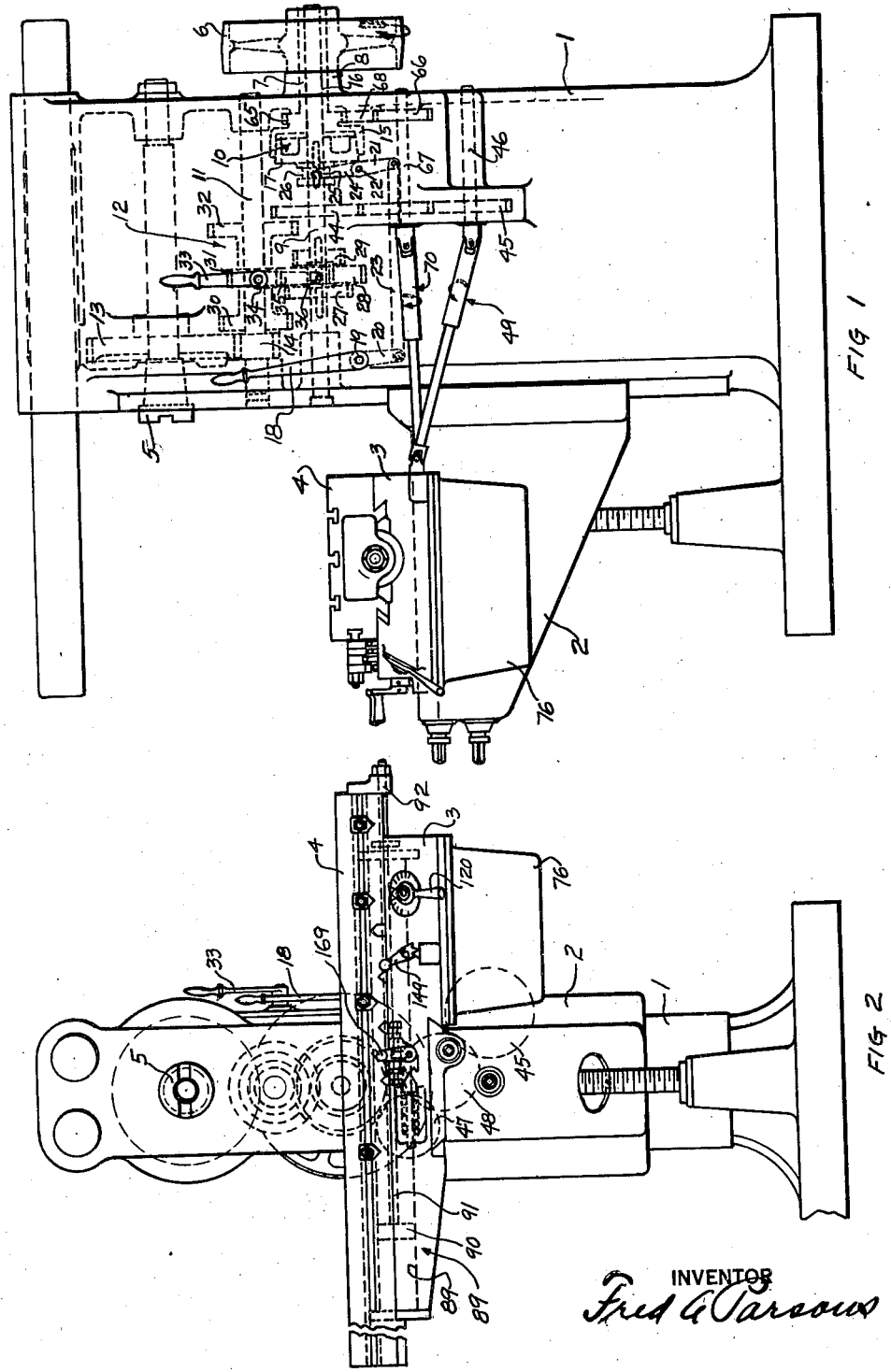

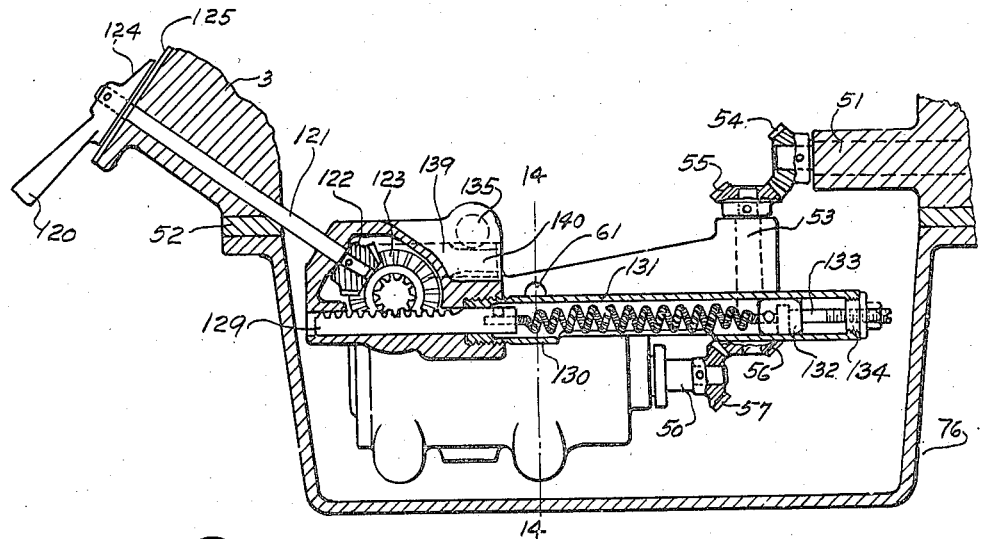

INVENTOR
Fred G Parsons

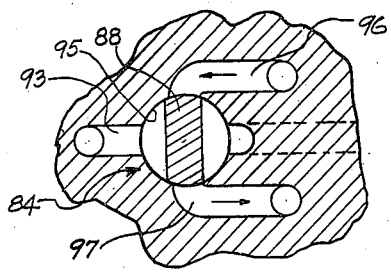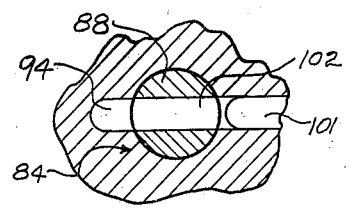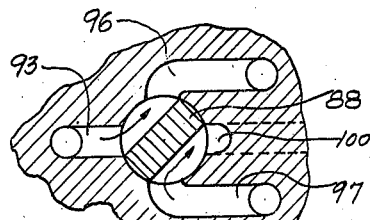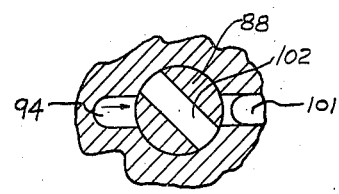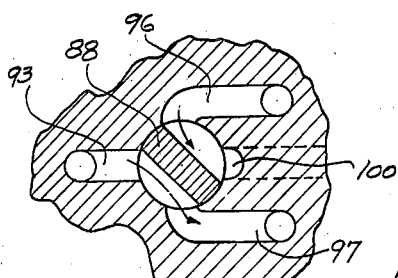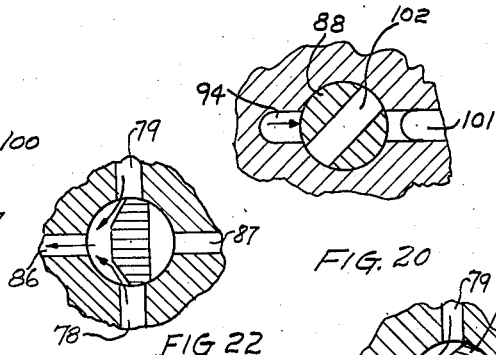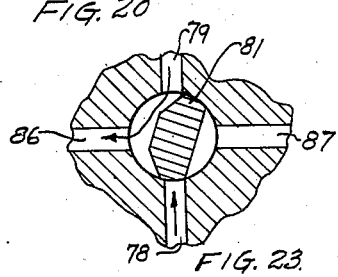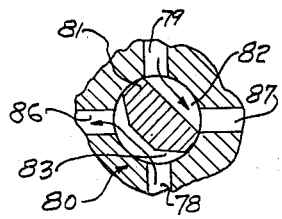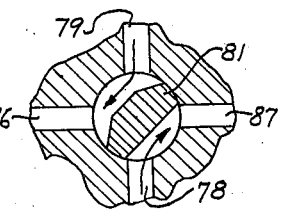

Patented Dec. 31, 1935

2,026,247

UNITED STATES PATENT OFFICE 2,026,247

MACHINE TOOL TRANSMISSION AND CONTROL

Fred A. Parsons, Milwaukee, Wis., assignor to Kearney & Trecker Corporation, West Allis, Wis.

Application December 12, 1930, Serial No. 501,889

24 Claims. (Cl. 90—21.5)

This invention relates to transmission and control mechanism for machine tools and more especially to such a mechanism in a form particularly adapted for milling machines.

A purpose of the invention is to provide an improved transmission and an improved control therefor and an improved combination of such transmission and control with a machine tool, more particularly for the relative movement of the work and cutter in a milling machine.

Another purpose is to provide improvements in a transmission which is in part fluid operated, and an improved control thereof, particularly of the fluid operated portion.

Another purpose is to provide improvements in a transmission having a fluid operated portion and in control means for maintaining the rate of a member driven therefrom substantially constant in spite of variations in fluid leakage caused by variations in load resistance or fluid characteristics.

Another purpose is to provide a machine tool including an improved hydraulic transmission capable of various settings or adjustments for driving a part of the machine tool at various pre-selected rates and means for maintaining a selected rate constant in spite of variations in resistance to travel of such part or in spite of changes in temperature and consequent changes in properties of the working fluid, or in spite of changes in both resistance and temperature.

Another purpose is to provide a machine tool and more particularly a milling machine in which structure suited for various of the purposes above mentioned, and for other purposes is combined in a manner to generally simplify and improve the construction and operation of the machine.

A further purpose is to generally simplify and improve the construction and operation of machine tools and particularly of milling machines, and further purposes and advantages will be apparent from this specification.

The invention resides in the combination and arrangement of parts as herein illustrated, described, and claimed and in such modifications of the structure illustrated as may be equivalent to the claims.

Like reference characters indicate like parts throughout this specification and the various views of the drawings, of which:

Fig. 1 is a right-side elevation of a milling machine involving the invention.

Fig. 2 is a front elevation of the same machine.

Fig. 4 is a section on the line 4—4 of Fig. 3.

Fig. 10 is a section on the line 10—10 of Fig. 8.

Fig. 11 is an enlarged view of certain valve sleeves shown in Fig. 8.

Fig. 12 is a sectional view of the valve sleeves shown in Figs. 8 and 11 on the line 12—12 of Fig. 11.

Fig. 13 is a development of the openings in the valve sleeves.

Fig. 14 is a section on the line 14—14 of Fig. 4.

Figs. 15, 17, 19 are sectional views on the line 15—15 of Fig. 6 showing various positions of a valve member.

Figures 6, 6A, 7:
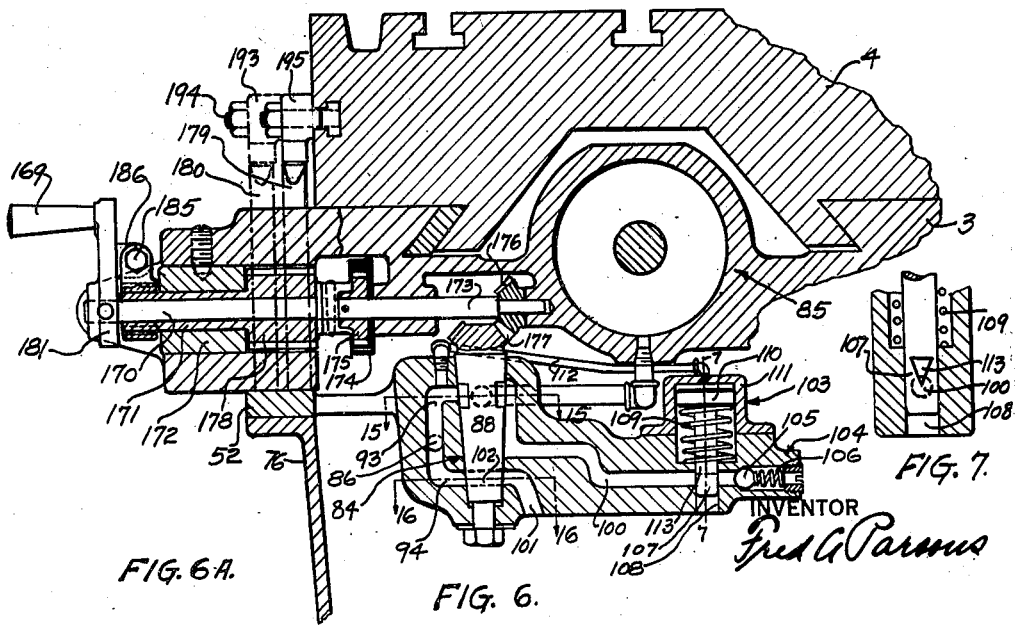
Fig. 6 is a section on the line 6—6 of Fig. 3.
Fig. 6a is a continuation of Fig. 6 but on the line 6a—6a of Fig. 3.
Fig. 7 is a part section on the line 7—7 of Fig. 6.

Figs. 16, 18, and 20 are sectional views on the line 16—16 of Fig. 6 showing another part of the same valve in different positions.

Figure 5:
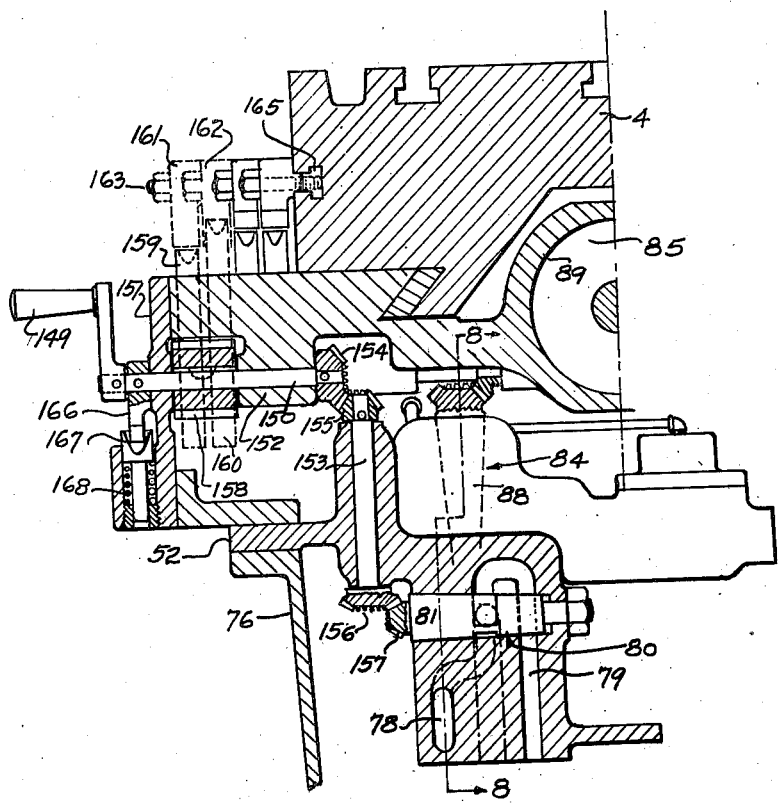
Fig. 5 is a section on the line 5—5 of Fig. 3.

Figs. 21 to 24 inclusive are sectional views on the line 21—21 of Fig. 5 showing a valve in different positions.

The machine illustrated includes a base or column 1, Figs. 1, 2, having vertically slidable thereon a knee 2 carrying a saddle 3 slidably adjustable relative to column 1 and supporting a work table 4 horizontally slidable on saddle 3 to the right or left in Fig. 2.

A tool spindle 5 is rotatably supported in column 1 above table 4 for which transmission mechanism is provided as follows:

A pulley 6 is fixed on a sleeve 7 journaled in a suitable bearing 8 in a wall of column 1 and drives a shaft 9 through a friction clutch, generally denoted by reference numeral 10, and shaft 9 drives a shaft 11 through a rate changer, generally denoted by numeral 12. Shaft 11 in turn drives spindle 5 by means of a gear 13 fixed with the spindle and meshing with a pinion 14 fixed with shaft 11.

The clutch 10 includes an outer member 15 fixed with sleeve 7 and having a bore for the reception of an extension 16 of shaft 9, extension 16 being journaled in the bore of sleeve 7 whereby sleeve 7 and member 15 may freely rotate relative to shaft 9, but shaft 9 will be held in axial alignment with sleeve 7. A member 17 slidably keyed with shaft 9 is adapted to frictionally engage a suitable recess in member 15 and may be moved into and out of engagement therewith by means of a hand lever 18 fixed on a shaft 19 journaled in a suitable bearing in column 1 and having also fixed therewith a lever 20 adapted to operate a lever 21, fixed on a shaft 22 journaled in suitable bearings in column 1, by means of a rod 23 pivoted at its ends to the respective levers. Shaft 22 has fixed thereon a lever 24 carrying at its end a portion 25 engaging a spool 26 fixed with member 17 whereby motion of lever 18 to the right or left in Fig. 1 will cause member 17 to move into and out of engagement respectively with member 15 and accordingly stop or start rotation of shaft 9.

The rate changer 12 comprises gears 27, 28, 29 fixed together and slidably keyed on shaft 9 meshing one at a time with gears 30, 31 32 fixed with shaft 11. Gears 27, 28, 29 may be shifted manually by means of a hand lever 33 fixed on a shaft 34 journaled in column 1 and having fixed on its inner end a lever 35. Lever 35 has a fork member 36 pivoted thereto and engaging the side edges of gear 28 whereby a swinging movement of lever 35 will cause sliding movement of gears 27, 28, 29 but without interfering with rotary motion of the gears.

Figure 8:
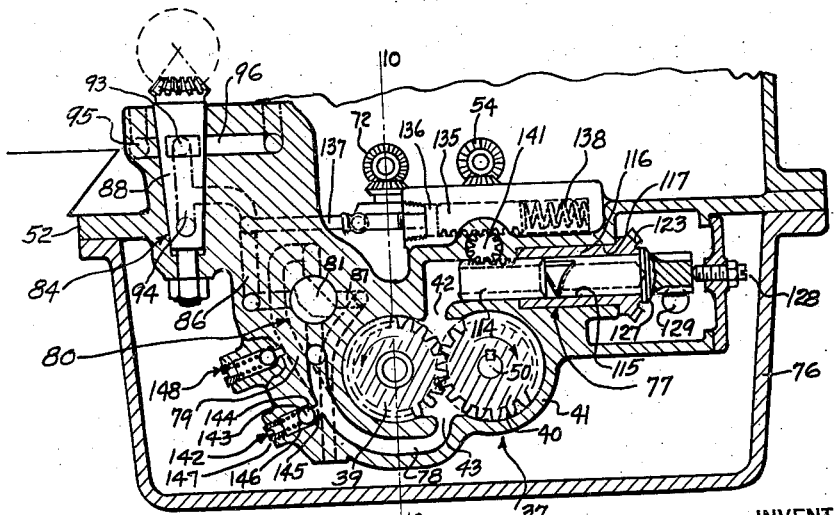
Fig. 8 is a section on the line 8—8 of Figs. 5, 9.
Figure 9:
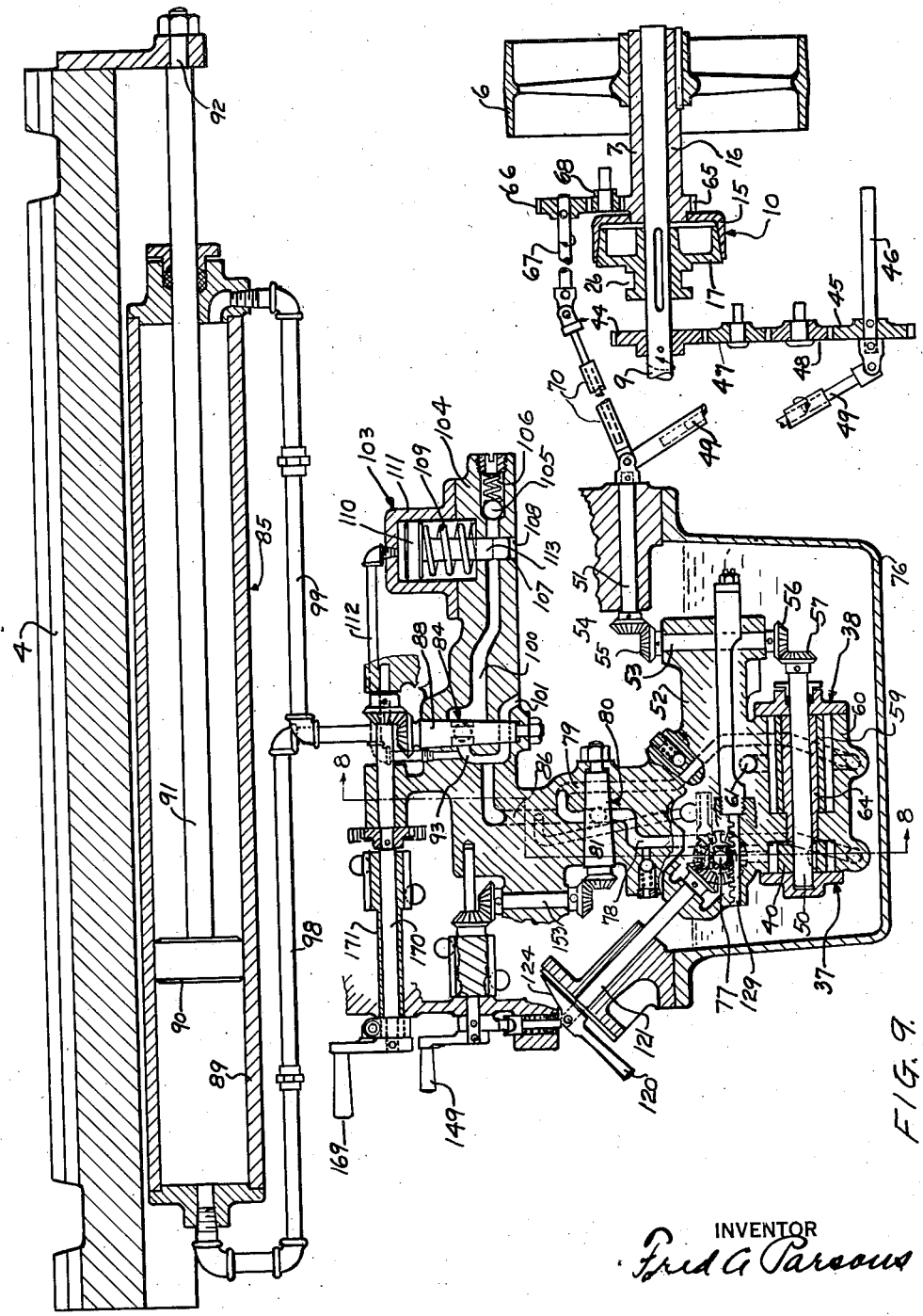
Fig. 9 is a schematic sectional view in the nature of a development showing the hydraulic circuits.

Transmission mechanisms is provided for movement of table 4 including a feed pump of relatively small displacement, generally denoted by numeral 37, Figs. 8, 9, and 10, and a rapid traverse pump of relatively large displacement, generally denoted by the numeral 38, Figs. 9, 10, and 14.

Pump 37 may be of any suitable type, but in this case consists of gears 39 and 40 meshed together within a substantially closed housing 41, as shown particularly in Figs. 8, 9, and 10, the housing providing an inlet port 42 and an outlet port 43. Pump 37 is connected to be driven from the spindle transmission at a point between clutch 10 and the rate changer 12 through a train consisting of a gear 44, Figs. 1 and 9, fixed on shaft 9 and driving a gear 45 fixed on a shaft 46 through idlers 47 and 48, Fig. 2. An extensible universal joint shaft of well-known form, generally denoted by numeral 49, connects shaft 46 to drive a pump shaft 50, Figs. 8 and 9, through a shaft 51, Fig. 9, journaled in a member 52 fixed with saddle 3 and constituting a means for supporting the pumps and their associated mechanism. Shaft 51 drives a vertical shaft 53 through bevel gears 54 and 55 fixed with the respective shafts and shaft 53 drives shaft 50 through bevel gears 56 and 57 fixed with the respective shafts, the joint shaft providing a connection between shafts 46 and 51 in any position of the movements of knee 2 and saddle 3.

Pump 38 may be of any suitable form, but in this case consists of gears 58 and 59, Figs. 9, 10, and 14, meshed together within a substantially closed housing 60 providing an inlet port 61 and an outlet port 62. Gear 58 is fixed on a shaft 63 and gear 59 is supported for rotation on a sleeve 64, Figs. 9 and 14, through which passes shaft 50 to reach pump 37. Shaft 63 is driven from the spindle transmission at a point between the clutch 10 and pulley 6 by means of a train including a gear 65, Figs. 1 and 9, fixed on sleeve 7, a gear 66 fixed on a shaft 67 and idler gear 68 connecting the gears 65 and 66, the shafts 67 and 69 being connected by means of an extensible universal joint shaft of well-known form, generally denoted by numeral 70, whereby shaft 67 may drive shaft 69 in any position of knee 2 and saddle 3. Shaft 69 drives a vertical shaft 71 through bevel gears 72 and 73 fixed with the respective shafts and shaft 71 drives shaft 63 through bevel gears 74 and 75 fixed with the respective shafts.

The pumps 37 and 38 are positioned within a hollow housing or casing, generally denoted by numeral 76, and providing a fluid reservoir with which the inlet ports 42 and 61 communicate. The inlet port 42 of the feed pump 37 communicates with the reservoir through a feed regulating throttle, generally denoted by numeral 77, Figs. 8, 9, 11, 12, and 13, and which will be described in detail below.

The output of each of the pumps 37 and 38 is lead through passages 78 and 79 respectively to a rate change valve, generally denoted by numeral 80, Figs. 5, 8, and 9, which includes a rotatable stem 81, Figs. 5, 8, 9, and 21 to 24 inclusive, having cut-away portions 82, the remaining portion of stem 81 being beveled as shown at 83, Fig. 21. From rate change valve 80 the fluid passes through suitable channels to a reverser valve, generally denoted by numeral 84, Figs. 5, 6, 8, 9 and 15 to 20 inclusive, and on to a fluid motor, generally denoted by numeral 85.

Outlet port 43 of fluid pump 37 communicates with rate change valve 80 adjacent a lower portion of valve stem 81 through passage 78, while outlet port 79 of rapid traverse pump 38 communicates with rate change valve 80 adjacent an upper portion of valve stem 81. A port 86, Figs. 8 and 21 to 24 inclusive communicates from rate change valve 80 to reverser valve 84 from a point to one side of valve stem 81 and an exhaust port 87 communicates freely with reservoir 76 from a point adjacent the other side of valve stem 81. Thus port 86 may be supplied from either pump 37 or 38, according to the position of valve stem 81, as will be apparent from Figs. 21 to 24 inclusive, the alternate pump discharging freely through port 87 and consuming substantially no power.

Port 86 leads to reverser valve 84 which includes a rotatable stem 88 having cut-away portions as particularly shown in Figs. 15, 17, and 19, and from reverser valve 84 through suitable channels to the one or the other end of a cylinder 89, Figs. 2, 5, and 9, constituting a part of fluid motor 85, fixed with saddle 3 and having a piston head 90 fixed with a piston rod 91 which is fixed at end 92 for movement with table 4, the communicating channels being as follows:

Port 86 communicates with ports 93 and 94, Figs. 8, 9, 15, 17, and 19, opening into a bore 95 of reverser valve 84 adjacent upper and lower portions of valve stem 88 respectively. Adjacent the upper portion of valve stem 88 are ports 96 and 97, Figs. 15, 17, and 19, communicating with passages 98 and 99 respectively, Fig. 9, communicating with end portions of cylinder 89 on opposite sides of piston 90. Adjacent the upper portion of valve stem 88 there is also a port 100, Figs. 9, 15, 17, and 19, leading to reservoir 76 through throttle devices to be described presently. Adjacent the lower portion of valve stem 88 there is a port 101, Figs. 9, 16, 18, and 20, communicating freely with reservoir 76.

The arrangement is such that when valve stem 88 is in the position shown in Figs. 15 and 16, the pressure port 86 communicates with port 101 through ports 94 and a port 102 formed in valve stem 88, the ports 96 and 97 leading to the cylinder being closed. When the valve stem 88 is in the position shown in Figs. 17 and 18, the pressure port 93 communicates with the left end, Figs. 2 and 9, of the cylinder 89 through port 96 and channel 98, valve port 102 being closed as shown in Fig. 18, the piston 90 and table 4 being thereby forced to the right in Figs. 2 and 9. Fluid in the right-hand end of the cylinder is then forced out through channel 99 and valve port 97 into port 100 and thence to reservoir 76.

When the valve stem 88 is in the position shown in Figs. 19 and 20, pressure port 93 communicates with the right-hand end, Figs. 2 and 9, of cylinder 89 through ports 93, 97 and channel 99, thereby moving the piston and table to the left, fluid from the left-hand end of the cylinder being forced to reservoir 76 through channel 98 and valve ports 96 and 100.

Port 100 communicates with reservoir 76 through a spring valve or throttle, generally denoted by numeral 103, Figs. 6 and 9, and another valve or throttle, generally denoted by numeral 104. Valve 104 provides a ball 105 pressed by a spring 106 whereby to maintain a predetermined back pressure against the escape of fluid from port 100. Valve 103 includes a plunger 107 fitted in a bore 108 and pressed upwardly in Figs. 6 and 9, by means of a spring 109 and having fixed thereon a piston head 110 movable in a cylinder 111. A pipe or channel 112 communicates from pressure channel 93 to the upper end of cylinder 111 whereby to oppose spring 109 by means of fluid under pressure derived from channel 93. The area of piston 110 is such that when a predetermined high pressure exists in channel 93, plunger 107 will be moved down against the pressure of spring 109 to a position to bring an opening 113 in plunger 107 into a position relative to outlet channel 100 such that the outlet channel is practically unrestricted, but if the pressure in channel 93 falls below a predetermined point or to zero, as it would for instance in case the cutter should catch the work and tend to pull table 4 along at a rate faster than that for which the feed mechanism is adjusted, spring 109 will move plunger 107 to substantially close the outlet channel 100 and thereby check such undesirable overrunning movement. For intermediate pressures the outlet restriction varies. The mechanism provides an automatic restriction of the motor outlet with a variety of attendant advantages more fully discussed in a preceding application, Serial 321,250, filed November 22, 1928.

The means for adjusting the rate of feed of table 4 comprises throttle 77 located in the intake channel of feed pump 37. As shown in Figs. 8 and 11 to 13 inclusive, throttle 77 consists of sleeves 114, 115, and 116 movable relatively to each other and to a bore 117 formed in member 52 and communicating with port 42. Sleeve 116 is rotatably fitted in bore 117 so as to be substantially fluid tight and has a port 118 which may register partially or wholly with an intake port 119 formed in member 52 and intersecting bore 117. Sleeve 116 may be manually rotated by means of a hand control 120, Fig. 4, fixed with a shaft 121 journaled in saddle 3 and actuating sleeve 116 through a bevel gear 122 fixed with shaft 121 and meshing with a bevel gear 123 fixed with sleeve 116. Hand control 120 is provided with a pointer 124 for indicating the adjustment of the parts against a scale 125, the proportions being such that the degree of registration of ports 118 and 119 will admit sufficient fluid to pump 37 to produce substantially the rate of table feed indicated by pointer 124.

With any type of throttle control of rate or volume difficulty may be experienced by reason of the fact that changes in viscosity of the working fluid, caused by changes in the temperature thereof, will cause changes in the amount of fluid admitted through the throttle opening and consequent discrepancies between the indicated and the actual rate. To compensate for this, in this instance sleeve 115 is rotatably fitted in the bore of sleeve 116 and projects into the throttle opening 118 of sleeve 116 partially closing the same. It has an angular end portion 126 such that rotary movement of sleeve 115 will cause a change in the effective area of the opening and accordingly in the fluid flow.

Sleeve 115 is prevented from axially moving relative to sleeve 116 by means of a shoulder 127 fixed with sleeve 115 and bearing against gear 123 and a set screw 128 fixed with a portion of member 52, as shown in Fig. 8. At the opposite end from portion 126 sleeve 115 is made solid and has gear teeth formed thereon engaging with rack teeth formed on a plunger 129, Figs. 4, 8, and 9, freely slidable in a bore formed in member 52. Plunger 129 is caused to move in response to variations in temperature by the action of a temperature responsive element which may be of any suitable type but in the present instance consists of a bi-metallic spring 130 which is formed of a composite strip of two metals of different coefficients of expansion, wound into a helix, the helix being then wound into a larger helix. Such a spring will elongate considerably under a slight rise of temperature. Spring 130 is located in a protecting casing 131 open on its under side as shown and fastened at one end to plunger 129 and at the other end to a block 132 which is slidable in the casing and may be longitudinally adjusted by means of a bolt 133 rotatably fixed with block 132 and threaded through a plug 134 fixed with casing 131. A lock nut or other suitable means may be provided to maintain the adjustment of bolt 133.

It is to be understood that various types of temperature responsive elements are adaptable to applicant's purposes, many of which are well known, and that applicant contemplates the use of any of these which may be found suitable, the structure disclosed being merely illustrative, and not to be taken as limiting the invention.

Changes in the length of spring 130 will cause sliding movement of plunger 129 and accordingly rotary movement of sleeve 115. The angle of end portion 126 is such that rotary movement of sleeve 115 in the direction caused by expansion of spring 130 will reduce the effective area of the intake port 119, while such movement in the direction caused by contraction of spring 130 will increase the effective area of the intake opening, the proportions of the various parts being such that the volume of working fluid admitted for any given setting of sleeve 116 will remain substantially constant, regardless of the changes in consistency of the fluid.

It is realized that there will be a certain amount of leakage of fluid past piston 90 and also from the high to the low pressure side of pump 37. The latter is without effect since pump 37 has a capacity considerably in excess of the maximum capacity of throttle 77 and any fluid leaking by the impellers is simply added to that coming through throttle 77 into port 42 and repumped, so that the volume of fluid forced through passage 78 is equal to the volume coming through throttle 77 at all times. The leakage past piston 90, however, will result in a slightly slower travel of piston 90 and table 4 than would be the case if there were no leakage. Furthermore, this leakage will vary inversely as the viscosity of the fluid and it will accordingly counteract to a certain extent the tendency of the table to run faster upon an increase in temperature of the working fluid which would be present were it not for the action of sleeve 115. It is accordingly contemplated that the action of sleeve 115 may be made to be such as not necessarily to maintain a constant flow of fluid through throttle 77, but to allow just sufficient change to compensate for the changed leakage past piston 90 caused by the change in viscosity of the fluid, and thereby maintain the rate of table 4 constant for any given pressure condition.

The leakage will also vary in accordance with the variations in pressure difference between the high and the low pressure sides of the system. Such variations in pressure may arise from a variety of causes and the leakage variations resulting therefrom will tend to cause undesirable variations in the speed of table travel, for any given setting of rate control throttle 77. This objectionable action is likely to develop in any hydraulic circuit, independently of the type of rate controller used. In the present instance it is counteracted by an automatic pressure responsive movement to sleeve 114 which, as shown in Fig. 8, is fitted for axial sliding movement in sleeve 116 and a reduced portion of bore 117, and projects into and partly closes the throttle opening 118 in sleeve 116. Sleeve 114 is actuated in response to the pressure obtaining in passage 86 and accordingly in cylinder 89 by means of a plunger 135 operating in a cylinder 136, receiving fluid from passage 86 through a duct 137. Movement of plunger 135 is opposed by a spring 138 and its motion is transmitted to sleeve 114 by means of a shaft 139, Fig. 4, journaled in a bore in member 52 and having a gear 140 fixed therewith at one end and engaging rack teeth formed on plunger 135. Shaft 139 has a gear 141, Fig. 8, fixed therewith on the other end and engaging rack teeth formed on sleeve 114.

Thus upon increase of pressure in cylinder 89 and port 86, plunger 135 is forced to the right in Fig. 8 against the resistance of spring 138, thereby, through rotation of shaft 139, moving sleeve 114 to the left. This movement increases the effective opening of throttle 77 and admits sufficient extra fluid to port 42 to compensate for the increased leakage resulting from the increased pressure, and the parts are so proportioned that the extra fluid maintains the rate of travel of table 4 in spite of the increased leakage.

Conversely, if the pressure in cylinder 89 falls, the leakage will tend to decrease and table 4 will tend to travel faster, but this effect will also be counteracted by sleeve 114, since spring 138 will overcome the diminished pressure in cylinder 136 and force plunger 135 to the left in Fig. 8, thereby moving sleeve 114 to the right and reducing the effective opening of throttle 77. The amount of fluid pumped will thus be reduced correspondingly with the decrease in fluid leakage, and the parts are proportioned so that the rate of table travel will be kept substantially constant in spite of the change in leakage.

The action of sleeves 114 and 115 is independent of that of sleeve 116 and the construction is such that the compensating devices are properly effective whatever the position of sleeve 116, so that compensation for temperature differences and pressure differences takes place automatically regardless of the position of sleeve 116, and the travel of table 4 is always substantially the same for any given setting of the feed rate controller.

In order to guard against damage to the transmission from overloads, or the like, a relief valve 142 is provided, communicating with port 78, as shown in Fig. 8. The valve comprises a ball 143 pressed against a seat 144 in a passage 145 leading from passage 78 by a spring 146 suitably pressed against the ball as by a hollow plug 147, the spring being of sufficient strength to seat ball 143 against all normal load pressures, but yielding in the event of excessive pressure to allow escape of fluid from port 78. A similar relief valve 148 is provided communicating with port 79 for relief of excessive pressure against the rapid traverse pump 38, the spring in this valve being sufficiently flexible to relieve any pressure substantially in excess of the normal rapid traverse pressure.

Rate change valve 80 and reverser valve 84 may be operated by any suitable means, but in the present case are operable either by hand or automatically through table dogs, as shown in Figs. 1, 2, 3, 5, and 6a. Thus rate change valve 80, Fig. 5, may be set to cause either feed or rapid traverse motion of table 4 by means of a hand lever 149 fixed with a shaft 150 journaled in a member 151 fixed with saddle 3 and in a bearing 152, and driving a vertical shaft 153 journaled in member 52 through bevel gears 154 and 155 fixed with the respective shafts. Shaft 153 has a bevel gear 156 fixed therewith and meshing with a bevel gear 157 fixed with valve stem 81, whereby movement of lever 149 will cause rotation of stem 81. Valve 80 may also be moved by means of table dogs, as follows:

Shaft 150 has fixed thereon a gear 158 meshing with rack teeth formed in plungers 159 and 160 vertically slidable in saddle 3 and engaging gear 158 on opposite sides of the axis thereof, whereby rotary movement of gear 158 will raise one plunger and lower the other. Plungers 159 and 160 have upper angular cam surfaces adapted to contact with dogs such as 161 and 162 respectively, fixed with table 4 at desired points by means of bolts 163 and 164 engaging a T-slot 165.

Plungers 159 and 160 are in different vertical planes perpendicular to shaft 150 as shown in Fig. 5, whereby a dog may contact one and not the other. Thus it is possible to provide as many of dogs 161 and 162 as desired, so that change from feed rate to rapid traverse rate may be automatically effected at as many points in the travel of table 4 as desired, the dogs of the type of 161 contacting plunger 159 only and those of the type of 162 contacting plunger 160 only, as shown in Fig. 5. If it is desired to effect operation of one or the other of plungers 159 and 160 upon one stroke of table 4 and not to effect such operation during the return stroke thereof, dogs 161 or 162 may be of the latch type of which numerous examples are well known and accordingly not described here. Thus contact of dog 162, Fig. 3, with plunger 160 will depress the plunger and rotate gear 158 in a clockwise direction, thereby shifting valve 80 from the feed position, shown in Fig. 21, to the rapid traverse position shown in Fig. 24, and raising plunger 159 into the path of dog 161.

The beveled portions of stem 81 shown in Figs. 21 to 24 inclusive are for the purpose of insuring that there will be no point in the movement of valve 80 where neither of ports 78 nor 79 will be in communication with port 86. If such a condition were permitted to occur during the shifting of the valve, it will be apparent that the table would stop and the shifting would not be completed, since there would be a failure of the fluid supply to motor 85. In the present situation, as shown in Figs. 21 and 22, during movement of the valve, fluid from one pump is not cut off until after fluid begins to be admitted from the other pump. Thus the table continues to move and shift valve 80 until it takes the position shown in Fig. 24 when table 4 moves at the new rate determined by the capacity of the rapid traverse pump now delivering fluid to motor 85. Fig. 22 shows the valve 80 in position midway between feed and rapid traverse positions wherein, owing to the beveled form of valve member 81, fluid is flowing to motor 85 through port 86 from both of ports 78 and 79.

At the instant the valve stem 81 is passing through the position shown in Fig. 23, port 78 is blocked and fluid coming from pump 37 escapes through relief valve 142. Table 4 will continue to move, however, since port 79 leading from rapid traverse pump 38 is still open and continued movement of table 4 will shift valve stem 81 to the position shown in Fig. 24.

A similar course of events will take place when dog 161 contacts plunger 159 and valve stem 81 will be shifted from the position shown in Fig. 24 to that shown in Fig. 21 and the rate of table 4 will be changed from rapid traverse to feed.

Figure 3:
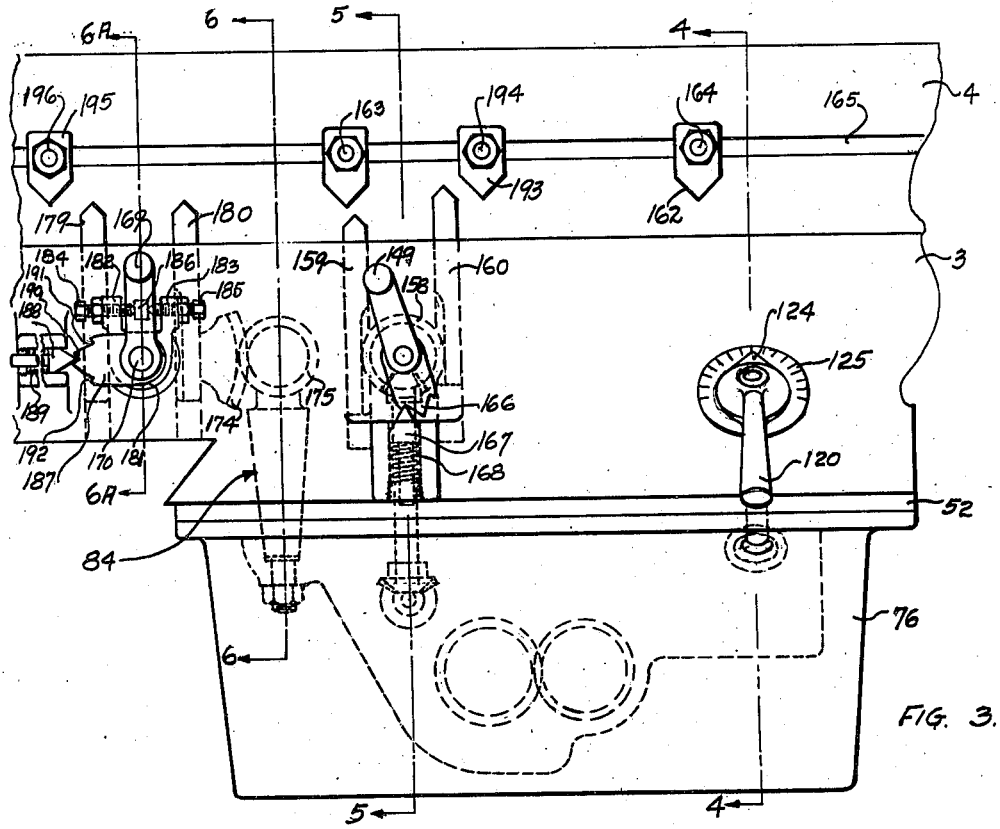
Fig. 3 is a front elevation of a portion of the machine enlarged.

In order to maintain valve 80 in its shifted position against accidental displacement and to cause a rapid and positive movement thereof when shifted by the dogs, a cam member, 166, Figs. 3 and 5, is fixed with shaft 150 and has notches for engagement with a plunger 167 pressed against member 166 by a spring 168.

Reverser valve 84 may be hand operated by means of a lever 169, Figs. 2, 3, 6a, and 9, fixed with a shaft 170 journaled in a bushing 171 which is in turn journaled in a member 172 fixed with a saddle 3. Shaft 170 drives a shaft 173 journaled in saddle 3 through a sector 174 and a gear 175 fixed with the respective shafts, shaft 173 actuating valve stem 88 through a bevel gear 176 fixed on shaft 173 and meshing with a bevel gear 177 fixed with valve stem 88, whereby movement of handle 169 to the right in Fig. 3 will turn valve stem 88 into the position shown in Figs. 17 and 18, whereby fluid will be admitted through port 96 and passage 98 to the left end of cylinder 89, causing piston 90 and table 4 to move to the right. Conversely, movement of handle 169 to the left will cause movement of table 4 to the left, as will be understood.

For automatic operation of valve 84 from table dogs, bushing 171 has a gear 178, Fig. 6, fixed therewith and meshing with rack teeth formed on plungers 179 and 180 vertically slidable in saddle 3 on opposite sides of gear 178. Bushing 171 also has fixed therewith a member 181 having lugs 182 and 183, Fig. 3, projecting upwardly at either side of lever 169 and constituting part of a lost motion device. Screws 184 and 185 are threaded through the bosses and engage a lug 186 fixed with lever 169. A cam 187 is also fixed with sleeve 170 and cooperates with a plunger 188 slidable in a bore in saddle 3 and pressed against cam 187 by a spring 189. Cam 187 has a central notch 190 cooperating with plunger 188 for yieldably holding the parts in a substantially central position and has other notches 191, 192, located at either side of notch 190, adapted when cam 187 is displaced from such central position to cooperate with plunger 188 to move cam 187 and bushing 171 to the limit of its travel in the direction in which it is initially displaced.

Thus, if hand lever 169 is moved to the left in Fig. 3 and no lost motion is provided between lug 186 and screws 184 and 185, bushing 171 will be rotated in a counterclockwise direction, cam 187 will be moved so that plunger 188 will drop into notch 191, plunger 180 will be raised into the path of a dog 193 fixed with table 4 at a predetermined point by means of a bolt 194 engaging T-slot 165 and valve 84 will be moved into the position shown in Fig. 19, opening port 97 to fluid pressure and causing table 4 to move to the left. Dog 193 will contact plunger 180 after a certain amount of table travel and depress the same, thereby rotating gear 178, bushing 171, and shaft 170 in a clockwise direction and moving valve stem 88 towards the position shown in Fig. 15, such movement causing cam 187 to force plunger 188 out of notch 191. When the parts have moved sufficiently, plunger 188 will drop into notch 190 and stem 88 will reach the position shown in Fig. 15 and table 4 will stop.

However, if lost motion is provided between lug 186 and screw 184, cam 187 will reach a central position before valve stem 88. Table 4 will accordingly continue to move, since valve 84 will not have reached the position shown in Fig. 15, port 97 will still be open, and dog 193 will cause cam 187 to move beyond a central position, whereupon plunger 188 will be caused by spring 189 to drop into notch 192, thereby forcing cam 187, bushing 171, and shaft 170 to rotate in a clockwise direction, moving valve stem 88 to the position shown in Fig. 17 and causing table 4 to move to the right.

At the same time, plunger 179 will be raised into the path of a dog 195 fixed with table 4 at a predetermined point by means of a bolt 196 engaging T-slot 165. If lost motion is provided between lug 186 and screw 185, the table will stop, as above outlined, upon contact of dog 195 with plunger 179, while if such lost motion is provided, the table will reverse at this point in the manner above outlined.

Thus the table may be caused to move in either direction at a feed rate determined by the setting of control 120 and such rate will correspond to the setting of control 120 under all conditions of temperature and load. Furthermore, the table may be caused to move at a rapid transverse rate at any desired point by manipulation of lever 158 and such result may also be accomplished automatically by means of table dogs.

It is to be understood that the dimensions and proportions of the parts shown in the drawings are to a large extent conventional and should be considered as subject to modification within the range of equivalents indicated in the annexed claims to the extent dictated by considerations of convenience and practicability.

What is claimed is:

1. In a machine tool, the combination of a movable member, a transmission for actuating said member including a fluid operable motor, a pump and a fluid circulating system including a channel between said pump and motor containing fluid under pressure; and control means for said transmission including a rate control throttling means shiftable for varying the rate of motor movement, a temperature responsive device, and mechanism for shifting said throttling means in accordance with changes in said temperature responsive device whereby to maintain said rate substantially constant in spite of variations in fluid temperature.

2. In a machine tool, the combination of a movable member, a transmission for actuating said member including a fluid operable motor, a pump and a fluid circulating system including a channel between said pump and motor containing fluid under pressure; and control means for said transmission including a throttling device adjustable to change the flow of fluid to said pump whereby to change the rate of fluid movement into said channel, a temperature responsive device, and mechanism connecting said throttling device to be shifted in accordance with changes in said temperature responsive device, whereby to maintain the rate of said motor substantially constant in spite of variations in fluid temperature.

3. In a milling machine, the combination of a rotatable tool spindle, a support for said spindle, a work support, one of said supports being movable relative to the other support in a direction transverse to the axis of said tool spindle, a power train for rotation of said spindle including a power source and a spindle rate changer, a transmission for movement of said movable support including a pump actuated from said power source to exclude said rate changer, a fluid operable motor and a fluid passage connecting said pump and motor, a reservoir for fluid, a channel connecting said reservoir and the inlet port of said pump, a throttling device associated with said channel and adjustable to change the volume of fluid delivered to said pump whereby to change the rate of fluid movement into said channel, a temperature responsive device and mechanism connecting said throttling device for movement in accordance with changes in said temperature responsive device, whereby to maintain the rate of said motor substantially constant in spite of variations in fluid temperature.

4. In a milling machine, the combination of a rotatable tool spindle, a support for said spindle, a work support, one of said supports being movable relative to the other support in a direction transverse to the axis of said tool spindle, a power train for rotation of said spindle including a power source and a spindle rate changer, a transmission for movement of said movable support and providing a fluid operable portion including a pump actuated from said power source to exclude said spindle rate changer, a fluid operable motor and a fluid passage connecting said pump and said motor, and control means for said transmission including a rate control throttle device associated with said fluid operable portion and adjustable to change the rate of actuation of said motor, a temperature responsive device and mechanism connecting said throttle device to be shifted in accordance with changes in said temperature responsive device, whereby to maintain said motor rate in spite of variations in fluid temperature.

5. In a milling machine, the combination of a rotatable tool spindle, a support for said spindle, a work support, one of said supports being movable relative to the other support in a direction transverse to the axis of said tool spindle, a power train for rotation of said spindle including a power source, a clutch and a spindle rate changer, a transmission for movement of said movable support including a pump actuated from said power source through said clutch to exclude said spindle rate changer, a fluid operable motor and a fluid passage connecting said pump and said motor, a reservoir containing working fluid, a channel connecting said reservoir and the inlet port of said pump; and rate control means for said transmission including a throttle device shiftable to change the area of the effective fluid passage therethrough, a temperature responsive device, and means operative to shift said throttle device in accordance with changes in said temperature responsive device.

6. In a machine tool, the combination of a movable member, a transmission therefor including a fluid operable motor, fluid supply means operable for effecting different rates of said motor including a relatively slow feed rate and a quick traverse rate, and a pressure channel connectible between said supply means and said motor; and control mechanism for said transmission including a first controller shiftable for alternative actuation of said motor at one or the other of said rates, and other control means including a throttle device shiftable independently of said first controller to change the volume of fluid delivery to said channel, a temperature responsive device associated with said transmission, and means connecting said throttle device to be shifted in accordance with changes in said temperature responsive device, whereby to maintain said feed rate of motor actuation substantially constant in spite of changes in temperature of the transmission fluid.

7. In a milling machine, the combination of a rotatable tool spindle, a support for said spindle, a work support, one of said supports being movable relative to the other in a direction transverse to the axis of said tool spindle, a power train for rotation of said spindle including a power source and a spindle rate changer, a transmission for said work support including a fluid operable motor, pump means driving from said power source to exclude said spindle rate changer and operable for effecting different rates of said motor including a feed rate and a rapid traverse rate, and a pressure channel connectible between said pump means and said motor, and control mechanism for said transmission including a first controller shiftable for alternative actuation of said motor at one or the other of said rates, and other control means including a throttle device shiftable to change the volume of fluid delivery to said channel, a temperature responsive device associated with said transmission, and means connecting said throttle device to be shifted in accordance with changes in said temperature responsive device.

8. In a milling machine, the combination of a rotatable tool spindle, a support for said spindle, a work support, one of said supports being movable in a direction transverse to the axis of said tool spindle, a power train for said tool spindle including a power source, and a spindle rate changer, a transmission of movement of said movable support including a feed rate pump and a quick traverse rate pump, each of said pumps being connected to be driven from said power source exclusive of said spindle rate changer, a fluid operable motor, and a pressure channel connectible to receive fluid from each of said pumps for said motor; and control means for said transmission including a first controller for connecting said motor to be operated exclusively from said feed pump or alternatively at a quick traverse rate, a throttle device shiftable for changing the rate of fluid delivery from said feed pump to said channel, a temperature responsive device associated with said transmission, and means connecting said throttle device to be shifted in accordance with changes in said temperature responsive device.

9. In a milling machine, the combination of a rotatable tool spindle, a support therefor, a work support, one of said supports being movable in a path transverse to the axis of said spindle, a power train for the rotation of said spindle including a power source and a spindle rate changer, a transmission for movement of said movable support including a feed rate pump and a quick traverse rate pump, both said pumps being driven from said power source to exclude said spindle rate changer, a fluid operable motor adapted to actuate said support, and a pressure channel connectible to receive fluid from each of said pumps for said motor, a fluid reservoir, channels for supplying fluid from said reservoir to said pumps including an inlet channel portion individual to said feed rate pump; and control means for said transmission including a first controller operable for connecting said motor to be operated exclusively from said feed pump or alternatively at a quick traverse rate, a throttle device associated with said feed pump inlet channel portion and shiftable for changing the rate of flow of fluid to said feed rate pump whereby to change the rate of fluid delivery from said feed pump to said pressure channel, a temperature responsive device, and means connecting said throttle device to be shifted in accordance with changes in said temperature responsive device.

10. In a machine tool, the combination of a movable member, a transmission therefor including a fluid operable motor, fluid supply means operable for effecting different rates of said motor including a series of relatively slow feed rates and a quick traverse rate, and a pressure channel connectible between said fluid supply means and said motor, and control mechanism for said transmission including a first controller shiftable for actuation of said fluid motor alternatively at one or the other of said feed or quick traverse rates, a second controller shiftable independently of said first controller to various positions each pre-selective of one of said series of feed rates to be effected upon subsequent shifting of said first controller, a third control means shiftable independently of each of said controllers for changing the rate of fluid delivery to said pressure channel during feed rate actuation of said motor, a temperature responsive device and means connecting said third control means to be shifted in accordance with variations in said temperature responsive device.

11. In a machine tool, the combination of a movable support, a transmission for movement of said support including a fluid operable motor, a feed rate pump, a quick traverse rate pump, and a pressure channel connectible between each of said pumps and said motor, and control mechanism for said transmission including a first controller shiftable for actuation of said motor exclusively from said feed pump or alternately at a quick traverse rate, a second controller operable independently of said first controller to change the rate of fluid delivery from said feed pump whereby to select a particular feed rate to be effected by operation of said first controller, a third control means shiftable independently of said controllers to change the volume of fluid delivery to said pressure channel during actuation of said motor from said feed pump, a temperature responsive device, and means connecting said third control means to be shifted in accordance with temperature changes in said temperature responsive device.

12. In a machine tool, the combination of a tool support, a support for said spindle, a work support, one of said supports being movable with relation to the other support, a transmission for movement of said movable support including a fluid operable motor, pump means and a pressure channel connecting said pump means and said motor; and control mechanism for said transmission including a first controller adjustable for changing the flow of fluid from said pump means to said pressure channel whereby to approximately predetermine a series of different rates of said motor, a second controller adjustable independently of said first controller for changing the flow of fluid from said pump means to said pressure channel, a temperature responsive device, and means connecting said second controller for adjustment in accordance with changes in said temperature responsive device and in a direction to increase the flow of fluid to said channel upon an increase in temperature and vice versa.

13. In a machine tool, the combination of a movable member, a transmission for actuating said member including a fluid operable motor, a pump having an inlet channel, and a pressure channel between said pump and motor and control mechanism for said transmission including a throttling device associated with said inlet channel and adjustable to change the flow of fluid to the inlet port of said pump, a pressure responsive device connected to be operated in accordance with variations in pressure within said pressure channel, and means connecting said throttling device for adjustment in accordance with changes in said pressure responsive device.

14. In a milling machine, the combination of a tool spindle, a support for said spindle, a work support, one of said supports being movable relative to the other support in a direction transverse to the axis of said tool spindle, a power train for said spindle including a power source and a spindle rate changer, a transmission for movement of said movable support including a pump having an inlet channel and actuated from said power source exclusive of said spindle rate changer, a fluid operable motor and a pressure passage connecting said pump and said motor, and control mechanism for said transmission including a throttle associated with said inlet channel and adjustable to change the rate of fluid delivery to said pump, a pressure responsive device connected to be operated in accordance with variations in pressure in said pressure channel, and means connecting said throttle for adjustment in accordance with changes in said pressure responsive device, and in a direction to increase the opening of said throttle when the pressure increases in said pressure channel and vice versa.

15. In a machine tool, the combination of a movable support, a transmission for movement of said support including a fluid operable motor, fluid supply means operable for effecting different rates of said motor including a relatively slow feed rate and a quick transverse rate, and a pressure channel between said supply means and said motor; and control mechanism for said transmission including a first controller shiftable for alternative actuation of said motor at the one or the other of said feed or quick traverse rates, a device determinative of the feed rate of operation of said motor, and other control means including a throttle shiftable independently of said first controller to change the volume of fluid delivery to said channel, a pressure responsive device connected to be operative in accordance with pressure changes within said channel, and a motion transmitting connection for shifting said throttle in accordance with changes in said pressure responsive device.

16. In a machine tool, the combination of a work support and a tool support, one of said supports being bodily movable, a tool actuating transmission including a rate changer and a power source, a transmission for movement of said movable support providing pump means including a feed rate pump, a quick traverse rate pump, both of said pumps being driven from said power source, exclusive of said rate changer, a fluid motor adapted to actuate said support, and a pressure channel connectible between each of said pumps and said motor, and control means for said transmission including a first controller alternatively operable for connection of said pump means for effecting a feed rate or a quick traverse rate of said motor, other control means shiftable independently of said first controller for changing the rate of fluid flow from said pump means to said pressure channel, a pressure responsive device operable in accordance with changes in pressure within said pressure channel, and means connecting said other controller to be shifted in accordance with changes in said pressure responsive device.

17. In a machine tool, the combination of a tool support and a work support, one of said supports being bodily movable, a tool actuating transmission including a rate changer and a power source, a transmission for movement of said movable support including a fluid operable motor, a pump driven from said power source and a pressure channel, connected between said pump and said motor, and control means for said transmission including a throttle manually adjustable for changing the rate of flow of fluid to said motor, means adjustable to change the flow of fluid to said pressure channel, a pressure responsive device operative in accordance with variations in the fluid pressure in said channel, and a motion transmitting connection from said pressure responsive device to said adjustable means.

18. In a machine tool, the combination of a work support and a tool support, one of said supports being bodily movable, a tool actuating transmission including a rate changer and a power source, a transmission for movement of said movable support providing pump means including a feed rate pump capable of fluid delivery at rates suitable for feed movement of said support, a quick traverse rate pump capable of fluid delivery at rates suitable for rapid traverse movement of said support, a fluid operable motor and a pressure channel connectible between each of said pumps and said motor; and control means for said transmission including valve means providing a first controller and associated with said channels for alternatively connecting said fluid motor to be operated exclusively from said feed pump or at a quick traverse rate, a feed rate change device providing a second controller and associated with said transmission and adjustable independently of said valve means for a variety of different feed rates of flow of fluid to said motor whereby to preselect a desired rate of actuation when said support is to be actuated at a feed rate, means providing a third controller adjustable independently of either other controller to change the volume of fluid delivered to said pressure channel, a pressure responsive device connected for operation in accordance with variations in fluid pressure in said pressure channel, and means connecting said pressure device for operation of said third controller.

19. In a machine tool, the combination of a movable member, a transmission for actuating said member including a fluid operable motor, a pump, and a fluid system including a pressure channel connected between said pump and motor, control means for said transmission including throttle means shiftable for changing the rate of flow of fluid to said motor, temperature responsive means operable in accordance with changes in temperature in the fluid in said system, pressure responsive means operable in accordance with variations in fluid pressure within said channel, and connections simultaneously operable to shift said throttle means in accordance with changes in both said temperature responsive device and in said pressure responsive device.

20. In a machine tool, the combination of a tool support, a work support, one of said supports being bodily movable, a transmission for movement of said movable support including a fluid operable motor, a source of fluid supply, and a pressure channel connectible between said supply source and motor, said supply source being alternatively operable for a relatively slow feed rate or for a quick traverse rate of said motor; and control means for said transmission including a controller alternatively operable to the effect actuation of said motor at the one or the other of said rates, a device shiftable independently of said controller to change the rate of flow from said source to said pressure channel, another device operable in accordance with changes in some of the operating conditions of said machine, and means connecting said shiftable means to be shifted in accordance with changes in said other device.

21. A machine tool as specified in claim 20 including a second controller associated with said transmission and adjustable for a variety of feed rates of fluid flow from said source, said second controller being adjustable independently of said first controller and of each of said devices.

22. In a machine tool, the combination of a tool support, a work support, one of said supports being movable relative to the other support, a transmission for actuation of said movable support including a fluid operable motor, a fluid pump, a pressure channel connected for operation of said motor from said pump, a reservoir for working fluid, an inlet passageway for conducting fluid from said reservoir to said pump and an outlet passageway for conducting fluid from said motor to said reservoir; and said control means for said transmission including throttling means associated with said inlet passageway and providing a plurality of portions independently adjustable for changing the rate of flow of fluid to said pump, temperature responsive means operative in accordance with temperature variations in said fluid, pressure responsive means operative in accordance with changes in fluid pressure within said pressure channel, manual means for adjustment of one of said portions, means for adjustment of another of said portions in accordance with changes in said temperature responsive device, means for adjustment of another of said portions in accordance with said pressure responsive device, a throttle device associated with said outlet passageway, another pressure responsive device operable in accordance with changes in the fluid pressure in said pressure channel, and means connecting the last mentioned throttle device to be operated in accordance with changes in the last mentioned pressure responsive device.

23. In a milling machine, the combination of a rotatable spindle, a spindle support, a work support, one of said supports being movable in a direction transverse to the axis of said spindle, a power train for said spindle including a power source and a spindle rate changer, a transmission for movement of said movable support and including a fluid operable motor, a fluid supply source including pump means driven from said power source to exclude said spindle rate changer, a pressure channel connectible to connect said pump means to actuate said motor and an outlet passage from said motor, said supply source being in part adjustable for a variety of rates of fluid supply, including a variety of relatively slow feed rates and a quick traverse rate; and control mechanism for said transmission including a first controller connected for adjustment of said adjustable portion for abruptly changing from said quick traverse rate to a feed rate or vice versa, a manually operable second controller selectively adjustable independently of said first controller and connected for adjustment of said adjustable portion for preselection of the feed rate to be effected by said first controller, a third controller connected for adjustment of said adjustable portion independently of said first and second controllers and for changing the volume of fluid delivered from said supply source to said pressure channel, automatic means for operation of said third controller in accordance with changes in some of the operating conditions of said machine, restricting means associated with said outlet channel and adjustable for restricting the outlet of fluid therethrough, and a pressure responsive device operative in accordance with pressure changes in said pressure channel for shifting said restricting means.

24. In a machine tool, the combination of a movable member, a transmission for actuating said member including a fluid operable motor, a fluid supply source and a pressure channel; and control mechanism for said transmission including throttling means associated with said transmission and adjustable for establishing a predetermined rate of flow of fluid through said channel, a pressure responsive device connected to be operative from variations in fluid pressure within said channel, and means connecting said pressure responsive device for adjustment of said throttling means.

FRED A. PARSONS.

CERTIFICATE OF CORRECTION.

Patent No. 2,026,247. December 31, 1935.

FRED A. PARSONS.

It is hereby certified that error appears in the printed specification of the above numbered patent requiring correction as follows: Page 7, first column, line 9, claim 8, for "of" first occurrence, read for; second column, line 28, claim 12, strike out the words and comma "a support for said spindle,"; page 8, second column, line 61, claim 20, strike out the word "the"; page 9, first column, line 13, claim 22, strike out the word "said" third occurrence; and that the said Letters Patent should be read with these corrections therein that the same may conform to the record of the case in the Patent Office.

Signed and sealed this 3rd day of March, A. D. 1936.

Leslie Frazer (Seal)                                Acting Commissioner of Patents.